United States Patent [19]

Eck

[11] 4,330,945
[45] May 25, 1982

[54] VEHICLE FRAME AND BODY ALIGNMENT APPARATUS

[75] Inventor: Leonard F. Eck, McPherson, Kans.

[73] Assignee: Kansas Jack, Inc., McPherson, Kans.

[21] Appl. No.: 135,867

[22] Filed: Mar. 31, 1980

[51] Int. Cl.³ ............................................. G01B 11/27
[52] U.S. Cl. .................................. 33/288; 33/203.18;
356/155; 248/226.2
[58] Field of Search ............... 33/288, 286, 287, 203.2,
33/203.21, 203.17, 203.18; 356/154, 153, 155,
138; 248/226.2, 221.4, 225.3 A

[56] References Cited

U.S. PATENT DOCUMENTS

| | | | |
|---|---|---|---|
| 1,927,178 | 9/1933 | Lemaire | 33/287 |
| 2,575,194 | 11/1951 | Smith | 33/288 |
| 3,001,755 | 9/1961 | Doyle | 248/221.4 X |
| 3,786,572 | 1/1974 | Larson . | |
| 3,805,396 | 4/1974 | Hunnicutt . | |
| 3,869,804 | 3/1975 | Friend . | |
| 3,962,796 | 6/1976 | Johnston | 33/DIG. 21 |
| 3,983,635 | 10/1976 | Jarman | 33/288 |
| 4,015,339 | 4/1977 | Horvallius | 33/288 |
| 4,049,230 | 9/1977 | Minniear | 248/226.2 |
| 4,055,061 | 10/1977 | Bayorgeon et al. . | |
| 4,058,903 | 11/1977 | Wilkerson | 33/288 |
| 4,095,902 | 6/1978 | Florer et al. . | |
| 4,098,003 | 7/1978 | Negrin . | |
| 4,135,823 | 1/1979 | Horvallius . | |
| 4,142,299 | 3/1979 | Alsina | 33/DIG. 21 |
| 4,154,531 | 5/1979 | Roberts, Jr. et al. . | |
| 4,165,567 | 8/1979 | Olsson . | |

FOREIGN PATENT DOCUMENTS 121981  5/1971  Norway ................................ 33/288

Primary Examiner—William D. Martin, Jr.
Attorney, Agent, or Firm—Fishburn, Gold and Litman

[57] ABSTRACT

An alignment checking and measuring apparatus for vehicle frame and body portions includes two or more measurement scale carriers which have connectors on opposite end portions thereof for attachment transversely to the vehicle. One of the measurement scale carriers has targets movably mounted on the end portions and another of the measurement scale carriers has sighting instruments, such as laser beam emitting instruments, mounted on the end portions. The measurement scale carriers are longitudinally spaced from each other. Longitudinally aligning the sighting instruments with the targets facilitates determination and correction of any damaged or misalignment condition in the vehicle frame and body. Comparison is made of the deviation, if any, in the parallelism of the lines of sight created by the longitudinally aligned targets and sighting instruments. Angular deviation of the lines of sight to symmetrical points on the vehicle frame and body tends to indicate damage or misaligned conditions.

6 Claims, 14 Drawing Figures

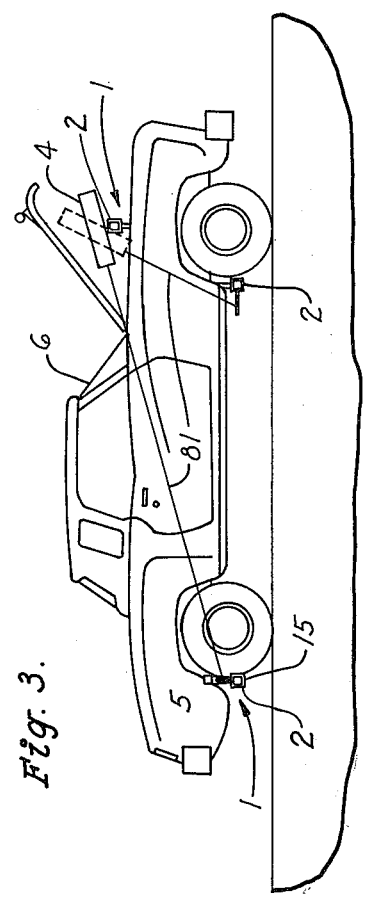
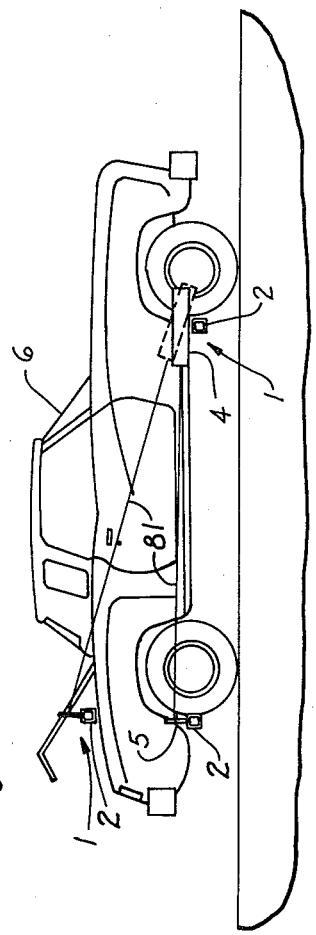
Fig. 2.
Fig. 3.
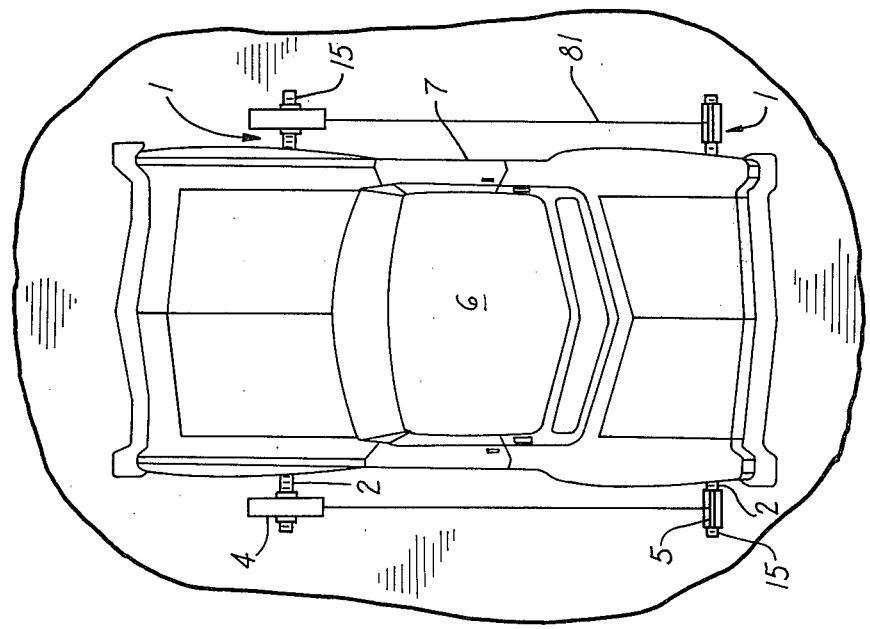
Fig. 1.

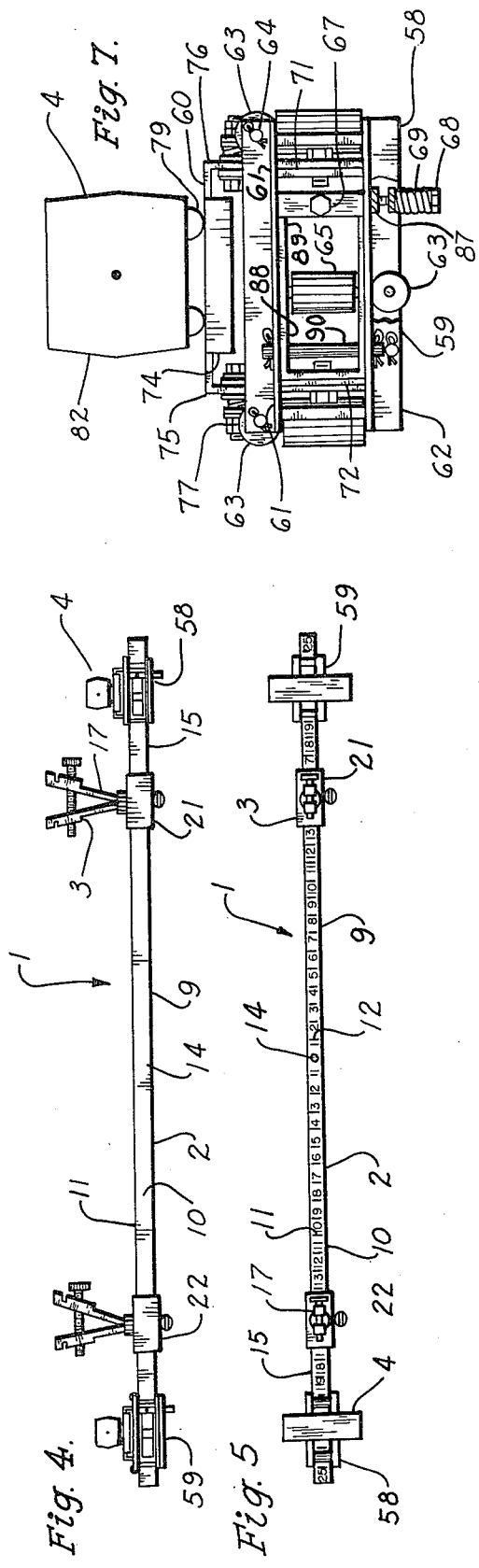
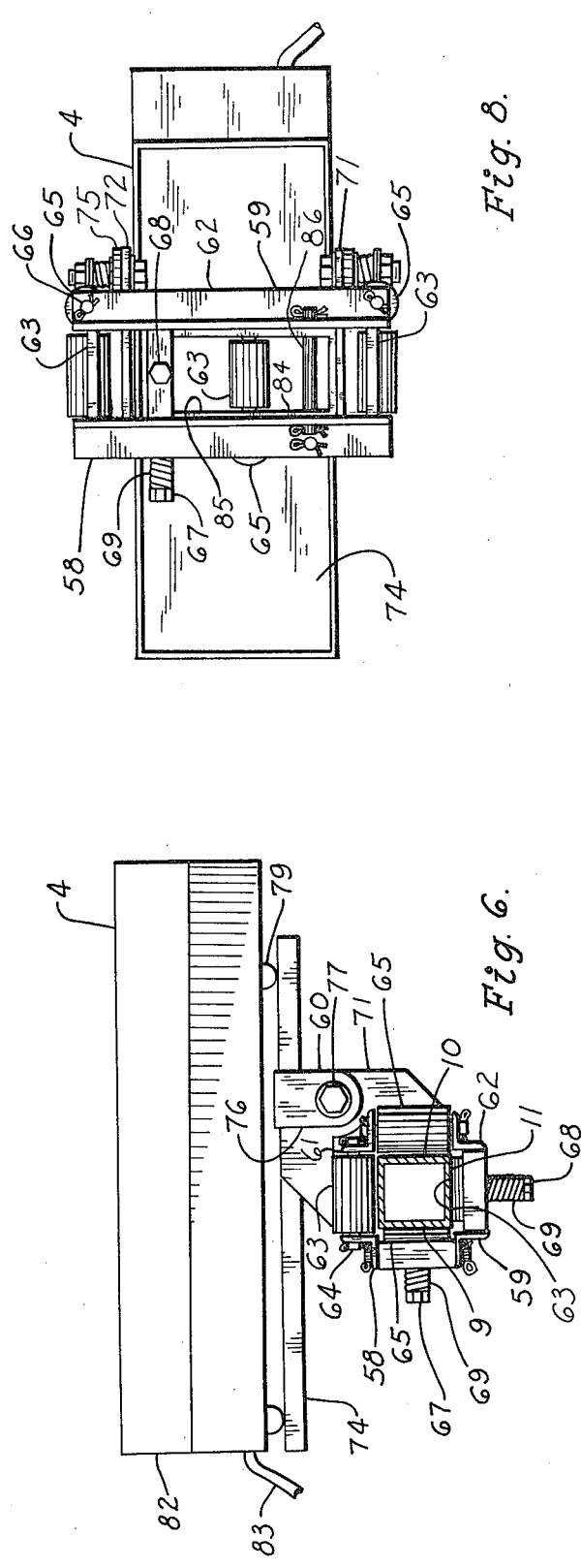

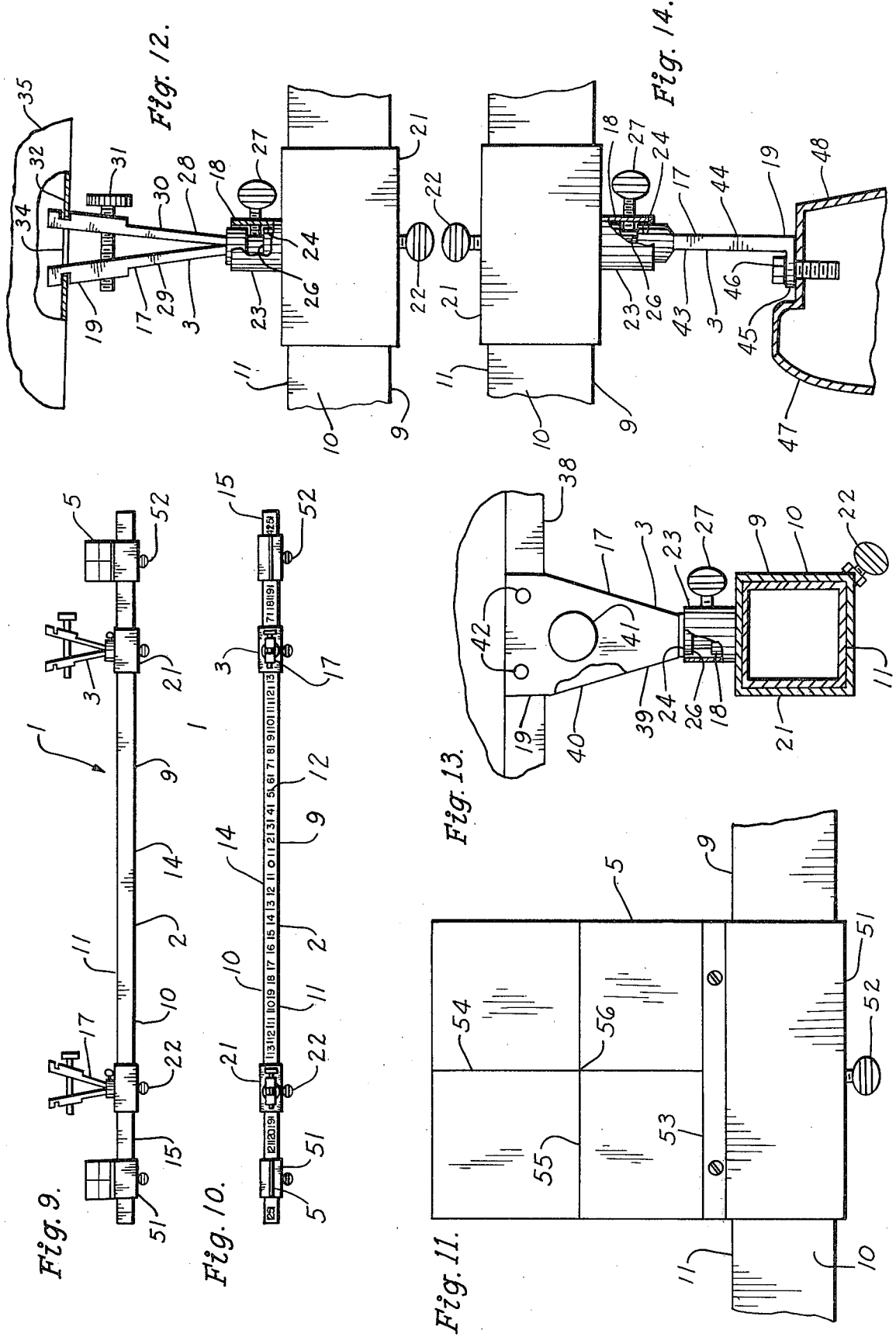

VEHICLE FRAME AND BODY ALIGNMENT APPARATUS

The present invention relates generally to a device for checking and measuring the geometric relationships of a vehicle frame and body and in particular to such a device having a straight line sighting instrument therewith.

The frame and body of a vehicle is constructed with respect to precise geometric relationships as determined by the manufacturer in order that the vehicle have proper driving and road holding properties as well as accurate exterior design measurement locations. Various apparatuses for effecting straightening of bent and damaged vehicle frame and body parts are known in the art as are known various gauges, rules and the like for determining the amount of damage to the vehicle frame or body members. These alignment measurement apparatuses are often unduly complex and cumbersome and require long periods of familiarization and usage in order for a vehicle frame and body repairman to become proficient in their operation.

The principal objects of the present invention are: to provide an apparatus for alignment of vehicle frame and body portions; to provide such an apparatus having a plurality of measurement bars which extend transversely of the vehicle and carry targets on end portions thereof for sighting and aligning operations; to provide such an apparatus having detachably and adjustably mounted sighting instruments to direct lines of sight at the targets and permit an operator to determine any deviation of the targets from longitudinal alignment; to provide such an apparatus having mounting means for the sighting instruments that permit translation thereof and sweeping a plane perpendicular to the axis of the measuring bar; to provide such an apparatus which is adaptable to various alignment operations and applications; and to provide such an apparatus which is relatively inexpensive, sturdy and efficient in use and particularly well adapted for the intended purpose.

Other objects and advantages of this invention will become apparent from the following description taken in connection with the accompanying drawings wherein is set forth, by way of illustration and example, a certain embodiment of this invention.

FIG. 1 is a plan, diagrammatic view of a vehicle frame and body alignment apparatus embodying the present invention and shown in connection with a vehicle.

FIG. 2 is a side elevational, diagrammatic view of the alignment apparatus and showing a method of use thereof.

FIG. 3 is a side elevational, diagrammatic view of the alignment apparatus and showing a second operational use thereof.

FIG. 4 is an elevational view of a measurement scale carrier and showing vehicle mounting means and sighting instruments positioned thereon.

FIG. 5 is a plan view showing the measurement scale carrier with vehicle mounting means and sighting instruments thereon.

FIG. 6 is a side elevational view of a sighting instrument and mounting means for positioning on the measurement scale carrier.

FIG. 7 is an end elevational view of the sighting instrument and mount therefor.

FIG. 8 is a bottom plan view of the sighting instrument and mount therefor.

FIG. 9 is an elevational view of the measurement scale carrier with vehicle mounting means and targets mounted on end portions thereof.

FIG. 10 is a plan view of the measurement scale carrier having vehicle mounting means and targets positioned on end portions thereof.

FIG. 11 is a fragmentary view of a target and mounting means therefor positioned on the measurement scale carrier.

FIG. 12 is a fragmentary view of a first embodiment of a vehicle mounting means and positioned on a measurement scale carrier.

FIG. 13 is a fragmentary elevational view of a second embodiment of a vehicle mounting means and positioned on the measurement scale carrier.

FIG. 14 is a fragmentary elevational view of a third embodiment of vehicle mounting means and positioned on the measurement scale carrier.

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIGS. 1 through 5, generally indicates a checking and measuring apparatus embodying the present invention. The apparatus includes one or more measurement scale carriers 2 having vehicle mounting means 3 adjustably mounted adjacent opposite ends thereof and variously employing either a sighting instrument 4 or a target 5 detachably and adjustably mounted on the measurement scale carrier 2. The measurement scale carriers 2 are mounted transversely of a vehicle 6 by vehicle mounting means 3. Selected carriers 2 support sighting instruments 4 which sight targets 5 mounted on other carriers 2 longitudinally displaced from the first carrier 2 with the sighting instrument 4 thereon. Use of the apparatus 1 permits an operator to accurately and quickly measure differences in alignment of one side 7 of the vehicle relative to the other side.

In the illustrated example, the measurement scale carrier 2 includes a rigid measurement bar 9 for extending transversely of the vehicle 6. The bar is preferably noncircular in cross-sectional shape, such as square tubing having opposite side surfaces 10 and upper and lower surfaces 11. The measurement bar 9 has a scale 12 thereon which has a "Zero" mark at the midportion 14 of the bar 9 and extends outwardly in both directions to opposite end portions 15 of the bar 9. Preferably, the scale 12 is marked with numerically increasing indicia commencing sequentially at the midportion 14 so that equal distances on the bar 9 from the midportion 14 can be readily determined.

Each vehicle mounting means 3 detachably and adjustably connects the measurement scale carrier 2 to the vehicle 6 and respectively includes a connector member 17 having first and second end portions 18 and 19. The connector members 17 are removably mounted on cooperating mounting means such as a slide member 21 sleeved on the bar 9 and of a cross-sectional size to fit securely therearound. The slide member 21 has a fastener such as a wing bolt 22 extending through a corner thereof and selectively contacting the surface of the bar 9 whereby tightening of the wing bolt 22 secures the slide member 21 to a selected longitudinal position on the measurement scale carrier 2. Opposite from the wing bolt 22 on the slide member 21 is a socket 23 having an internal opening 24 sized to receive the first end portion 18 of the connector member 17 therein. Preferably, both the socket 23 and first end portion 18 of the connector member 17 are circular in configuration so that the connector member 17 is generally free to swivel or pivot in the socket 23.

Different configurations of connector members 17, FIGS. 12, 13 and 14, are adapted for connection at a second end portion 19 to various respective vehicle frame and body bolt positions. The first end portion 18 of the connector member 17 is detachably mounted in the socket 23 and engagement means extend therebetween for selectively securing the first end portion 18 therein. In the illustrated example, groove 26 surrounds the first end portion 18 and a thumb screw 27 extends through the socket 23 for engagement therewith.

The connector member 17, FIG. 12, is an aperture connector 28 and has spaced, springlike fingers 29 and 30 with a thumb screw 31 extending therethrough and operable to selectively draw together and part the fingers 29 and 30. Second end portions 19 of the fingers 29 and 30 have grooves 32 formed therein. The second end portions 19 of the fingers 29 and 30 insert into an aperture 34 of a vehicle frame member 35 and, after insertion, are spread by the thumb screw 31 so that the grooved end portions 19, engage the walls or lips of the aperture 34 to affix the aperture connector 28 therein and support the end portion 15 of the measurement bar 9.

The connector member 17, FIG. 13, is a flange connector 37 for attachment to vehicle body flanges 38 and has relatively broad, spaced, springlike arms 39 and 50 connected by a thumb screw 41 for drawing the arms 39 and 40 apart and together. The second end portion 19 of the arms 39 and 40 is relatively broad and flattened and has pointed pins 42 extending through the outer portion of each arm 39 and 40 for point contact to bite into the surface of the flange 38, thereby supporting the measurement bar 9.

Yet another form of connector member 17, FIG. 14, is a bolt connector 43 for connection to a body bolt position and has a single shaft 44 with the second end portion 19 forming an L-shaped foot 45 thereon. The foot 45 has a bore therethrough to accept a fastener or bolt 46 to extend therethrough and insert into a bolt hole at adjoining portions of the body, such as the juncture of an external fender 47 and internal engine compartment liner 48.

The aperture connector 28, flange connector 37 and bolt connector 43 are used as desired to either suspend the end portion 15 of the measurement scale carrier 2 therefrom in hanging relation, FIGS. 2, 3, 12 and 13, or support the end portion 15 in superior spaced relation, FIGS. 2, 3, 12 and 13.

Positioned on the end portions 15 of the measurement scale carrier 2 are either the sighting instruments 4 or the targets 5. As shown in connection with FIGS. 1, 2 and 3, certain measurement scale carriers 2 have targets 5 mounted thereon while others have sighting instruments 4 thereon.

The targets 5 are detachably and adjustably mounted on at least one of the end portions 15 of a selected measurement scale carrier 2 and, in the illustrated example, FIG. 11, are mounted upon slide members 51 of a cross-sectional size for securely sleeving over the bar 9 and having a thumb screw 52 extending therethrough and selectively tightenable to secure the slide member 51 at a desired location on the bar 9. A flange 53 is attached to the slide member 51 and the target 5 secured thereto. In the illustrated example, the target 5 is a planar member, square in configuration, and has vertical and horizontal indicia 54 and 55 crossing at a center aiming point 56.

Interchangeable with the targets 5 on the end portions 15 of the measurement bars 9 are the sighting instruments 4. Each sighting instrument 4 is supported by mounting means 58 therewith including a movable carrier member 59 facilitating longitudinal translation on the measurement scale carrier 2. Further, pivot means 60 located between the carrier member 59 and the sighting instrument 4 permit the sighting instrument to be swung upwardly and downwardly and sweep a plane perpendicular to the axis of the measurement scale carrier 2.

In the illustrated example, the carrier member 59 has a rectangular framework of spaced upper and lower frame members 61 and 62 supporting a plurality of rollers 63 having the rotative axes thereof oriented in a horizontal direction and mounted on spindles 64. The rollers 63 maintain rolling contact with opposite upper and lower surfaces 11 on the measurement scale carrier 2. The upper and lower frame members 61 and 62 also support rollers 65 having the rotative axes thereof in a vertical orientation for rotatively engaging the opposite side surfaces 10 of the measurement bar 9. The rollers are supported on spindles 66.

A lowermost horizontally extending roller 63 is supported by a vertically adjustable subframe assembly 84, FIG. 8, including a rectangular frame 85 situated between spaced lower frame members 62. One end portion of the frame 85 is pivotally connected to the frame members 62, as by a pin 86 for swinging in a vertical plane toward and away from the lower surface 11 of the measurement scale carrier 2 extended through the carrier member 59, FIGS. 4 and 5. The lower horizontal roller 63 is mounted intermediately on the frame 85. A vertical adjustment screw 68 extends through the other end portion of the frame 85 and connects to a crossbar 87 extending between the lower frame member 62. A coil spring 69 sleeved on the adjustment screw 68 maintains tension thereon.

Similarly, a forward vertically extending roller 65 is supported by a horizontally adjustable subframe assembly 88, FIG. 7, including a rectangular frame 89 situated between spaced upper and lower frame members 61 and 62. One end portion of the frame 89 is pivotally connected to the frame members 61 and 62, as by a pin 90 for swinging in a horizontal plane toward and away from the side surface 10 of the measurement scale carrier 2 extended through the carrier member 59, FIGS. 4 and 5. The vertical roller 65 is mounted intermediately on the frame 89. A horizontal adjustment screw 67 extends through the other end portion of the frame 89 and connects to a crossbar (not shown) similar to the crossbar 87 and extending between the upper and lower frame members 61 and 62. A coil spring 69 sleeved on the adjustment screw 67 maintains tension thereon.

Through selective adjustment of the horizontal and vertical adjustment screws 67 and 68, the respective subframe assemblies 88 and 84 swing toward and away from the measurement scale carrier 2 to control freedom of sliding movement of the carrier member 59 thereon. Adjusting the subframe assemblies 88 and 84 into tighter engagement with the surfaces 10 and 11 of the measurement scale carrier restricts freedom of translational movement and conversely, loosening the adjustment screws 67 and 68 reduces pressure of the rollers 63 and 65 on the surfaces 10 and 11 and allows for easier translational movement.

To provide for pivoting, spaced, L-shaped support arms 71 and 72 are secured to the upper and lower frame members 61 and 62 and extend upwardly thereof. A mounting base 74 for the sighting instrument 4 is situated between the upper portions of the L-shaped arms and pivotally connected thereto as by ears 75 and 76. The ears 75 and 76 are pivotally connected to the L-shaped support arms 71 and 72 by fasteners such as bolts 77 whereby the mounting base 74 is swingable upwardly and downwardly to permit a sighting instrument thereon to sweep a plane perpendicular to the longitudinal axis of the measurement scale carrier 2.

The sighting instruments 4 are respectively positioned atop the mounting base 74 and affixed thereto such as by shock absorbent mountings 79 to isolate the sighting instrument 4 from minor shocks and vibrations which would otherwise adversely affect the instrument. The sighting instrument may be a telescope, light beam projector or the like and in the illustrated example, the sighting instrument 4 comprises a low power laser which projects a line of sight 81 beam of coherent, collimated radiation capable of great accuracy for alignment. The sighting instruments 4 are preferably sufficiently sensitive to minor misalignment angles to permit relatively precise alignment of the vehicle frame and body. In the illustrated example, each laser is mounted within a housing 82 having an electrical power line 83 extending thereinto.

In the use of the checking and measuring apparatus 1, a plurality of measurement scale carriers 2 are positioned transversely of the vehicle 6, FIGS. 1, 2 and 3, and used to provide longitudinal alignment from one portion of the vehicle 6 relative to another portion spaced therefrom. Many applications for the checking and measuring apparatus 1 can be devised and in the illustrated examples FIGS. 1, 2 and 3, several such examples are shown. Many types of body or frame damage can occur in a vehicle, such as twisting of the frame, thereby giving both a horizontal and vertical misalignment, parallelogram form deformation of the spaced frame main rails, thereby giving only horizontal misalignment and major body area crushing, as from massive collisions and the like and providing damage with both horizontal and vertical components of misalignment.

In FIG. 1, measurement scale carriers 2 are positioned beside the vehicle front and rear wheels and suspended from vehicle frame members by use of either the aperture connectors 28 or the flange connectors 37. After suspending the measurement scale carrier 2 by the connectors, the bar 9 is translated through the tubular member 21 to position the Zero mark at the midportion 14 of the bar in centered relation to the vehicle. Several such measurement scale carriers 2 are connected to the vehicle and preferably placed both at positions where there appears to be no misalignment, thereby using these locations for reference, and positions where there is known damage or misalignment. On at least one of the measurement scale carriers 2, which may be positioned at either a damaged or reference position, sighting instruments 4 are mounted thereon by sleeving the carrier members 59 supporting the sighting instruments over the opposite bar end portions 15 and positioning the sighting instruments 4 at equal distances from the bar midportion 14, such as 35 inches therefrom. In the example shown in FIG. 1, alignment of the rear end of the vehicle is determined relative to the front end of the vehicle through the use of measurement scale carriers 2. Preferably, the measurement scale carriers 2 are positioned at manufacturer's specified locations for which measurements and angles to other specified locations or points are listed. A measurement scale carrier 2 having the targets 5 mounted therein is connected to the vehicle in spaced relation to the scale carrier 2 having the sighting instruments 4 thereon. The targets are preferably positioned equidistantly from the bar midportions 14.

Using the sighting instrument 4, a line of sight 81 beam is projected toward a generally longitudinally aligned associated target 5 and the target 5 is translated along the measurement scale carrier 2 until the line of sight 81 impinges upon the center aiming point 56 thereof. The operator then directs his attention to the other side of the vehicle 6 and projects a line of sight 81 toward the generally longitudinally aligned associated target 5 and translates the rear target 5 along the measurement scale carrier 2 until the line of sight 81 thereof impinges upon the target center aiming point 56. The indicia on the measurement scale carrier 2 are noted, for example, 35 left and 35 right and the distance between the connectors or vehicle mounting means 3 and the targets 5 noted. The distance should be the same on both sides of the vehicle 6 and, if not, one side is misshapened relative to the other side. Appropriate corrective measures can then be accomplished to make a pull, push, or the like and remove the damage. While the vehicle is undergoing corrective operations, the measuring scale carrier 2 can remain attached thereto and the thumb screws 22 on the slide members 21 can be loosened to accomodate the changes in distance as the damage is removed.

FIG. 2 shows a second application of the alignment checking and measuring apparatus 1 and, in the illustrated example, a measurement scale carrier 2 is mounted immediately aft of the vehicle front wheels and carries the sighting instruments 4 thereon to beam lines of sight 81 at a second measurement scale carrier 2 located aft of the vehicle rear wheels. A third measurement scale carrier 2 is situated transversely of the trunk opening to measure any damage in that area and supported by flange connectors 37 attached to a flange 38, such as shown in connection with FIG. 13, extending around the lip or rim of the open trunk. The flange connectors 37, in this example, act as standards supporting the measurement scale carrier. Sighting instruments 4 at the front end of the vehicle 6 project lines of sight 81 to impinge upon the targets 5 positioned at the rear of the vehicle 6. Body damage in the region of the vehicle trunk can be determined and measured by noting the difference between the vehicle mounting means 3 and the target 5 at one side of the vehicle relative to the distance therebetween at the other side of the vehicle.

The sighting elements 4 can be used to either beam lines of sight toward damaged or misaligned areas or beam lines of sight therefrom.

In FIG. 3, a checking and measuring arrangement is shown having a first measurement scale carrier 2 mounted atop the MacPherson strut towers of the vehicle 6 and projecting lines of sight 81 toward a second measurement scale carrier 2 situated aft of the vehicle rear wheels and a third measurement scale carrier 2 situated aft of the vehicle front wheels. The vehicle mounting means 3 of the first measurement scale carrier 2 act as standards to support the bar thereabove and, as shown in connection with FIG. 14, bolt connectors 43 are employed as vehicle mounting means 3. Each sighting instrument 4 is oriented to beam lines of sight 81 therefrom toward a target 5 at one side of the rear mounted measurement scale carrier 2 and the sighting instruments 4 translated on the bar 9 until the lines of sight 81 thereof impinge upon the center aiming point 56 of each target 5. The sighting procedure is repeated for the opposite side 7 of the vehicle 6 and the distances between the vehicle mounting means 3 and the sighting instruments 4 on each side of the strut tower mounted measurement scale carrier 2 noted to provide an indication of misalignment at either the location of the first measurement scale carrier 2 or the measurement scale carrier 2 mounted aft of the vehicle rear wheels. If collision damage is apparent at one of the two locations, it follows that the misalignment would be at that location. The ability of the pivot means 60 to permit the sighting instrument 4 to sweep a vertical plane allows the sighting instrument to beam a line of sight 81 toward the measurement scale carrier 2 mounted thereunder and aft of the vehicle front wheels. To facilitate this use, the targets 5 thereof are removed from the end portions 14 of the bar 9 and, rotated 90 degrees and replaced on the bar so that the target extends horizontally for impinging the line of sight 81 on the center aiming point 56. The differences in symmetry of respective sides of the vehicle can be thereby noted.

Other uses of the alignment and checking and measuring apparatus 1 will become apparent from the foregoing disclosure. The measuring scale carrier 2 can even be attached adjacent the rear end of the vehicle 6 and the sighting instruments 4 mounted thereon to project lines of sight to the vehicle front wheels and check for camber, caster, toe-in and other front wheel alignment measurements (not shown).

It is to be understood that while one form of this invention has been illustrated and described, it is not to be limited to the specific form or arrangement or parts herein described and shown, except insofar as such limitations are included in the following claims.

What is claimed and desired to secure by Letters Patent is:

1. An alignment checking and measurement apparatus for vehicle frame and body portions comprising:
   (a) a plurality of measurement scale carriers each comprising an elongate, rigid bar having opposite end portions; each bar having scale indicia extending substantially the length thereof;
   (b) cooperating mounting means including mounting slide members sleeved about a respective bar and translatable at least on the opposite end portions thereof, each of said mounting slide members respectively having sockets affixed thereto and having connectors extending outwardly from said sockets and pivotally mounted therein, said connectors including finger means for connection to selected vehicle frame and body portions corresponding to vehicle measurement points;
   (c) said cooperating mounting means being positioned on said opposite end portions for mounting said measurement scale carriers transversely of the longitudinal axis of said vehicle;
   (d) target means detachably and adjustably mounted on the end portions of a first of said measurement scale carriers and respectively including a target slide member sleeved about a respective bar and translatable thereon and a planar member extended outwardly from a respective target slide member and having target indicia thereon; and
   (e) a laser beam emitting sighting instrument detachably and adjustably mounted on the end portion of a second of said measurement scale carrier for mounting on said vehicle in longitudinally spaced relationship to said first of said measurement scale carriers with said sighting instrument longitudinally spaced from said target means for longitudinally aligning said sighting instrument and said target means by impinging the laser beam of a sighting instrument on a respective target means planar member whereby the point of impingement of said laser beam relative to a respective target indicia may be seen by an operator;
   (f) said sighting instrument having mounting means including a carrier member for translating movement on said end portion of said second measurement scale carrier and pivot means located between said second scale carrier member and said sighting instrument; said pivot means facilitating said sighting instrument in swinging about said second measurement scale carrier such that said laser beam sweeps a plane perpendicular to the longitudinal axis of said second measurement scale carrier.

2. The apparatus set forth in claim 1 wherein:
   (a) said connectors include spaced fingers for insertion into an aperture at one of said measurement points in said vehicle, said fingers having a threaded fastener extended therethrough and selectively rotatable to draw said fingers together for insertion into said aperture and urge said fingers apart for engagement with the sides of said aperture.

3. The apparatus set forth in claim 1 wherein:
   (a) said connectors include spaced fingers comprising a clamp for engagement with a flange at one of said measurement points in said vehicle, said fingers having a threaded fastener extended therethrough and selectively rotatable to draw said fingers together and clamp about said flange.

4. The apparatus according to claim 1 wherein:
   (a) said sighting instrument mounting means includes a plurality of rollers; each of said rollers being in rolling engagement with said second measurement scale carrier to facilitate smooth translation of said sighting instrument carrier member therealong.

5. The apparatus according to claim 4 wherein:
   (a) said second measurement scale carrier includes upper and lower horizontal surfaces and a pair of opposed vertical side surfaces when positioned on a vehicle frame; and
   (b) said plurality of rollers include a first and a second roller having vertically aligned axes for engaging said opposed vertical side surfaces respectively and a third and a fourth roller having horizontally aligned axes for engaging said upper and lower horizontal surfaces respectively.

6. The apparatus according to claim 5 wherein:
(a) at least two of said plurality of rollers engage one of said carrier upper and lower horizontal surfaces and at least two of said plurality of rollers engage one of said carrier opposed vertical side surfaces.

* * * * *